(Model.)
4 Sheets—Sheet 1.
W. D. FORBES.
RAPID FIRING ARM.
No. 466,778.
Patented Jan. 12, 1892.
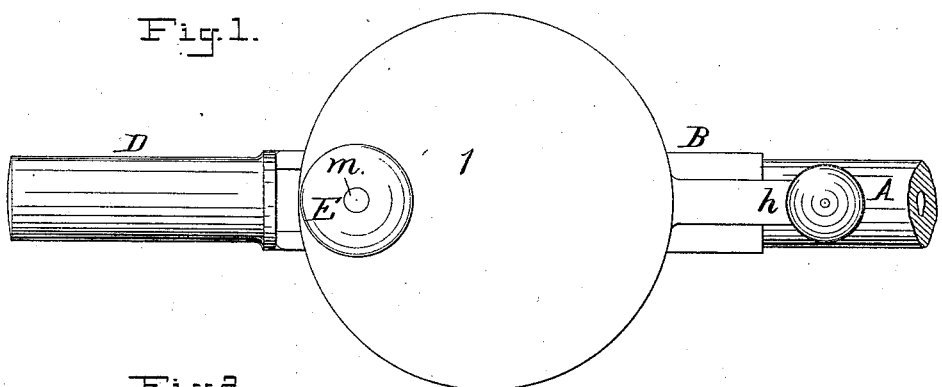
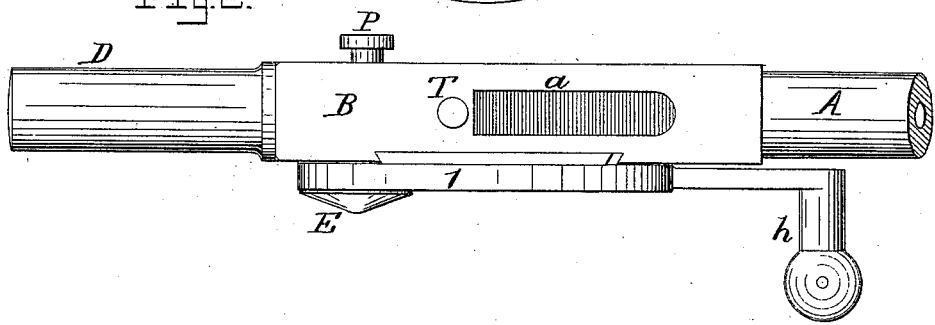
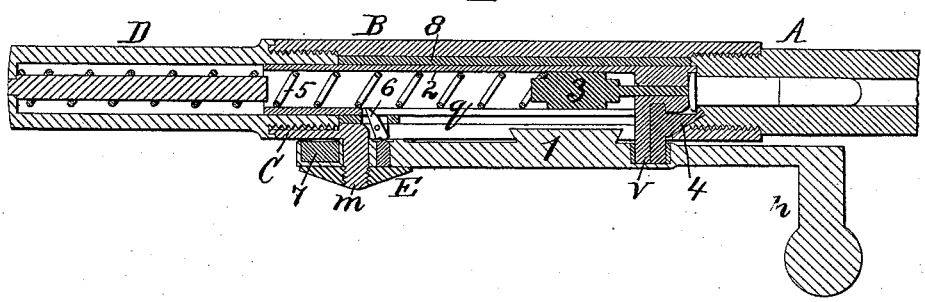
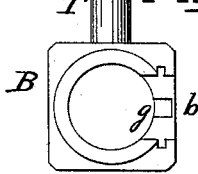
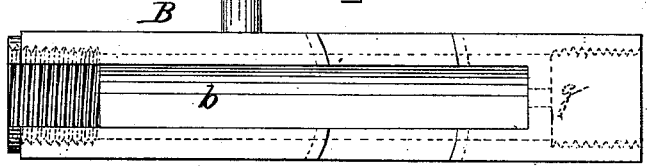
WITNESSES:
George Baumann
John Revell
INVENTOR
William D. Forbes
BY Howson and Howson
his ATTORNEYS (Model.)
W. D. FORBES.
RAPID FIRING ARM.
No. 466,778. Patented Jan. 12, 1892.
4 Sheets—Sheet 2.
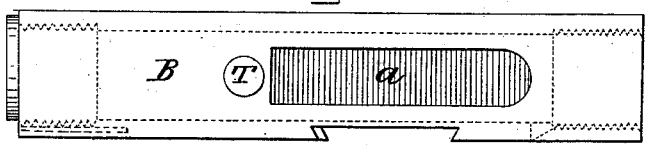
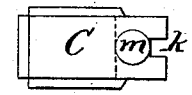
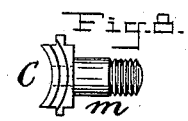
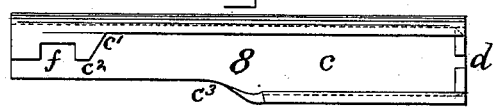
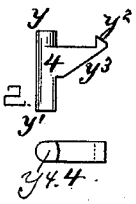
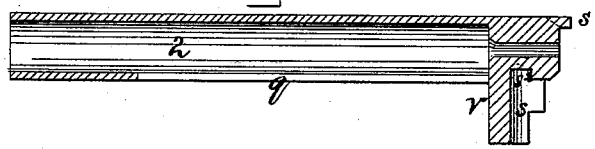
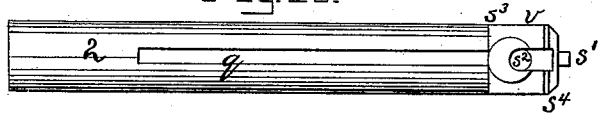
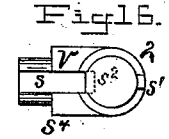
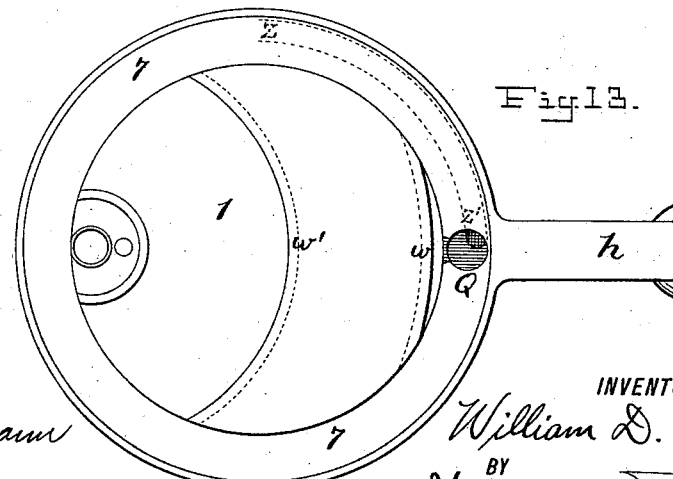
WITNESSES:
George Baumann
John Revell
INVENTOR
William D. Forbes
BY
Howson and Howson
his ATTORNEYS (Model.)
4 Sheets—Sheet 3.
W. D. FORBES.
RAPID FIRING ARM.
No. 466,778.
Patented Jan. 12, 1892.
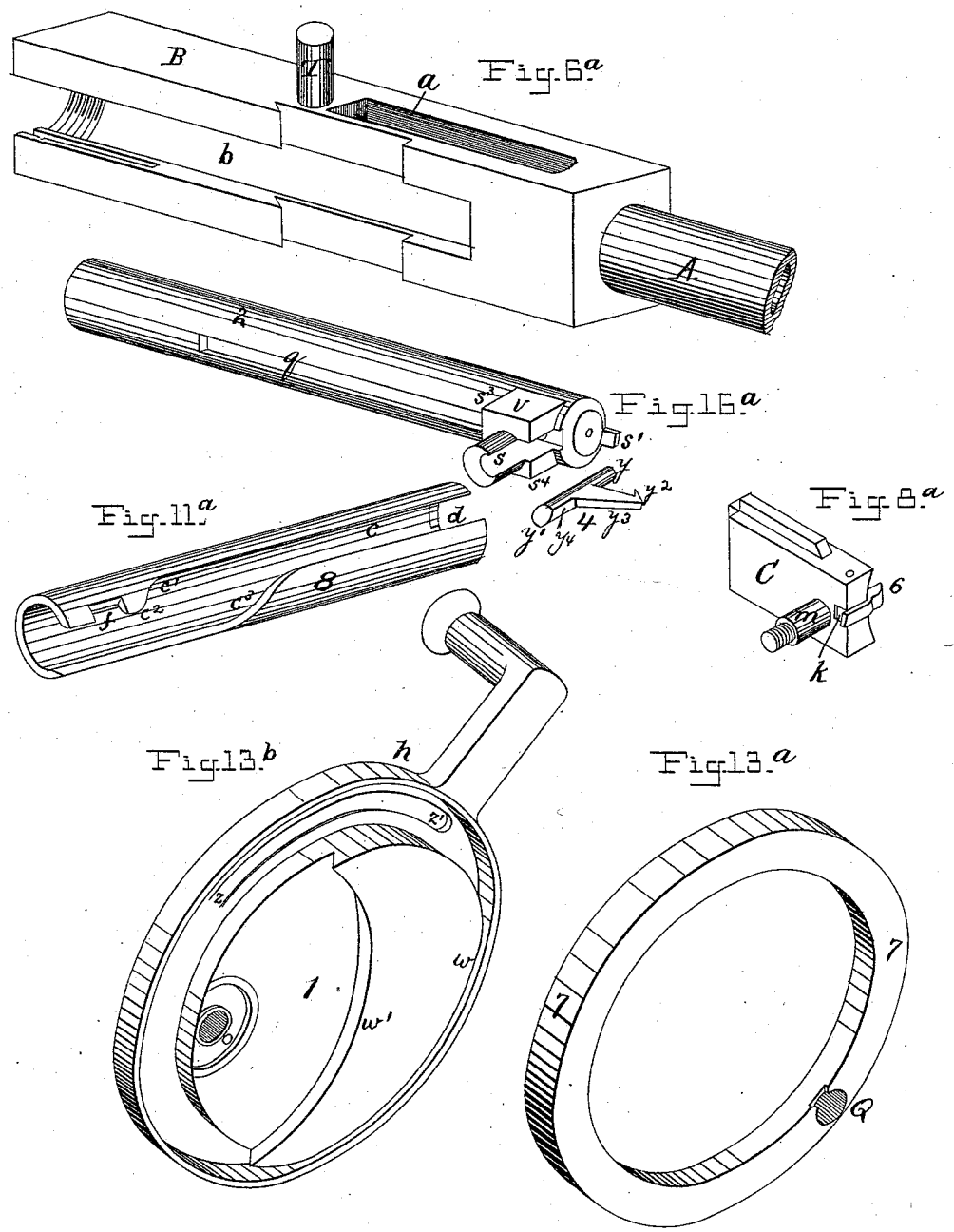
WITNESSES:
George Baumann
John Revell
INVENTOR
William D. Forbes
BY
Howson and Howson
his ATTORNEYS.

(Model.)
4 Sheets—Sheet 4.
W. D. FORBES.
RAPID FIRING ARM.
No. 466,778. Patented Jan. 12, 1892.
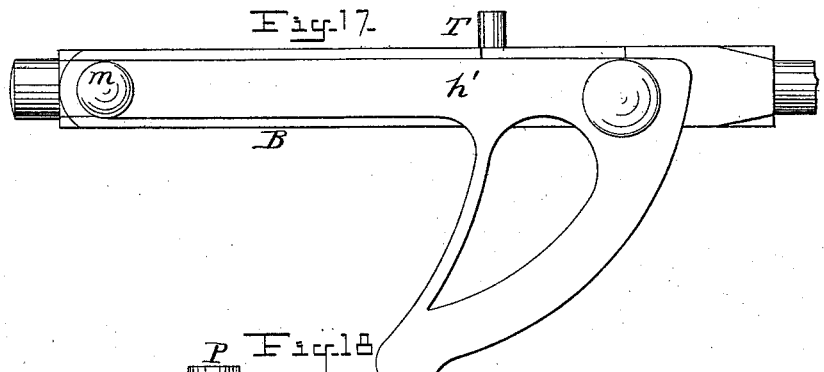
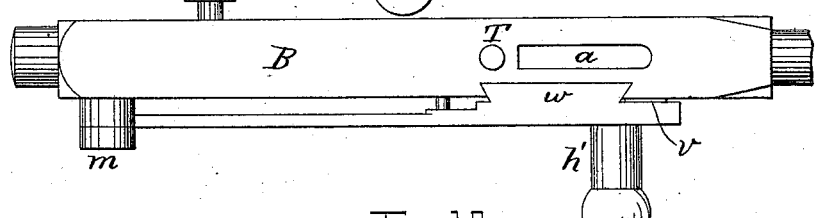
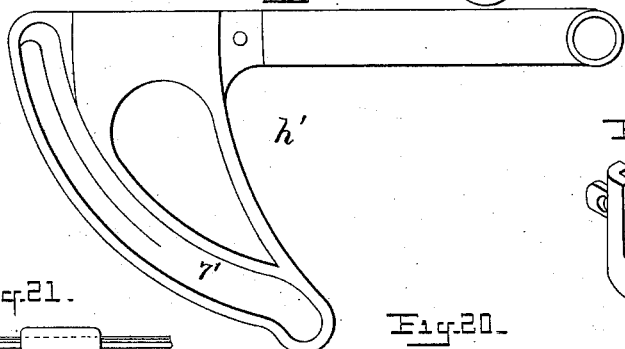
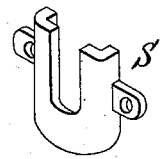
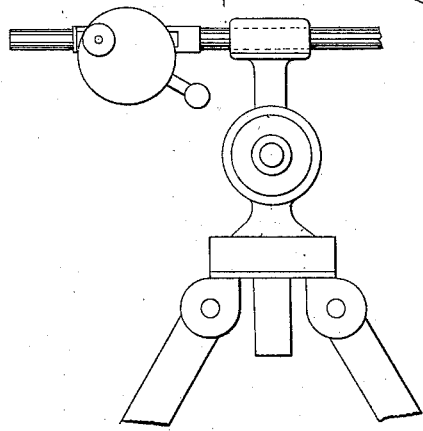
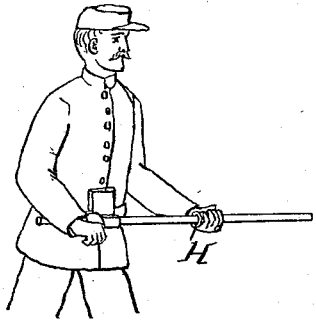
WITNESSES:
George Baumann
John Revell
INVENTOR
William D. Forbes
BY Howson and Howson
his ATTORNEYS

UNITED STATES PATENT OFFICE.

WILLIAM D. FORBES, OF MORRISTOWN, NEW JERSEY.

RAPID-FIRING ARM.

SPECIFICATION forming part of Letters Patent No. 466,778, dated January 12, 1892.

Application filed December 30, 1890. Serial No. 376,285. (Model.)

*To all whom it may concern:*

Be it known that I, WILLIAM D. FORBES, a citizen of the United States, and a resident of Morristown, Morris county, New Jersey, have invented Improvements in Rapid-Firing Arms, (Case A,) of which the following is a specification.

This invention relates to that class of fire-arms commonly called "repeating" or "rapid-firing" and of the breech-loading type.

The object of my invention is to produce such a fire-arm of great simplicity, cheapness, and durability capable of very rapid firing in the hands of those not previously accustomed to its use, and of so few and simple parts as to require no tools to assemble them or take them apart; and, further, it has been my object to dispense with all spring-operated parts except for the firing-pin, and to so simplify the necessary motions of loading and locking, exploding the cartridge, and extracting and ejecting the empty shell as to make it practically impossible for those using it (however unskillful) to do anything but produce the required results.

In the accompanying drawings all the main parts of my fire-arm which have motion are indicated by numbers, while those main parts which have no motion are indicated by large letters. The details of the various main parts are indicated by small letters.

Figure 1 is a side view of the fire-arm, showing the main part of the barrel broken off. Fig. 2 is a corresponding plan. Fig. 3 is a corresponding longitudinal sectional plan. Figs. 4, 5, 6, and 6ᵃ are views of the main frame or receiver B, Fig. 4 being an end view looking from the butt or cap end, Fig. 5 a side elevation, Fig. 6 a plan, and Fig. 6ᵃ a perspective view. Figs. 7, 8, and 8ᵃ are views of what may be termed the "pin-slide," Fig. 7 being a side view, Fig. 8 an end view from the rear, and Fig. 8ᵃ a perspective view, the latter with the trigger in place. Fig. 9 is a view of the firing-pin. Figs. 10, 11, and 11ᵃ are perspective views of what I may term the "safety-gate," Fig. 10 being an end view, Fig. 11 a side view, and Fig. 11ᵃ a perspective view. Fig. 12 shows two views of the cartridge-shell extractor, which is also shown in perspective in Fig. 16ᵃ. Fig. 13 is an inside face view of the operating eccentric and bolt-locking device. Figs. 13ᵃ and 13ᵇ are perspective views of the eccentric and the strap, respectively. Figs. 14, 15, 16, and 16ᵃ illustrate the breech-bolt, Fig. 14 being a sectional plan, Fig. 15 a side view, Fig. 16 a front end view, and Fig. 16ᵃ a perspective view. Figs. 17, 18, and 19 show a modification. Figs. 20, 20ᵃ, 21, and 22 are views illustrating different ways of mounting and using the arm.

Referring to Figs. 1 to 16ᵃ, A is the barrel screwed into the front end of the frame or receiver B, and into the rear of this frame is screwed the cap-piece D. The frame or receiver B has on its upper side the opening $a$, Figs. 2, 6, and 6ᵃ, for the admission of fresh cartridges from a magazine of any suitable construction, which it has not been thought necessary to indicate in the drawings. It may be secured upon a suitable pin T on the top of the frame or receiver. In the side of this frame or receiver is an ejection-opening $b$, Figs. 5 and 6ᵃ, for the discharge of the empty cartridge-shells as they are successively drawn from the barrel. The rear end of this opening $b$, when the parts are fitted together, is closed by a removable part of the frame—the slide C—which carries the pivot-pin $m$ for the rotating operating-handle $h$ to be grasped in the hand of the user of the weapon. The trigger 6 is also pivoted to this slide C in a horizontal slot or notch $k$, so that the inner end of the trigger may project into and through a longitudinal slot $q$ in the breech-bolt 2, which is contained within the receiver or frame B and has the necessary linear motion imparted to it backward and forward at proper times by means of the operating-eccentric 1, carried by the rotating handle. The handle which carries this operating-eccentric 1 is free to turn upon the pivot $m$, being retained in position upon the latter by a nut E, Fig. 3. There is fitted upon this eccentric 1, or rather within an annular groove in this eccentric 1, the ring or strap 7, which at a suitable point has a round opening Q for the reception of the corresponding cylindrical end of the laterally-projecting arm $v$ of the bolt 2, Figs. 3, 13, and 13ᵃ. This ring being, as it will be seen, mounted eccentrically to the pin $m$, upon which the handle turns, it will be evident that as this handle is rotated a linear reciprocating motion will be imparted to the sliding breech-bolt 2 within the frame or receiver B. When the breech-bolt reaches the forward end of its motion, it will have pushed into the barrel the fresh cartridge and will have closed the breech, Fig. 3, while on the return movement against the action of the spiral spring 5, the empty cartridge-shell will be withdrawn, as hereinafter described, and ejected through the lateral opening $b$. The advantage of using this eccentric and ring and mounting the ring in an annular groove is that a steadier movement is given to the breech-bolt than by other mechanical devices, a larger bearing is given to the lug $v$ of the bolt, as hereinafter referred to, and the circular slot is kept free from dirt. The handle $h$ also carries the segment $w\ w'$ with dovetailed edges to engage with a corresponding groove in the frame or receiver to lock the breech-bolt to the frame or receiver while the bolt is in the closed position.

The firing-pin 3 is contained within the breech-bolt 2 and the spiral spring 5 tends to push this firing-pin out to the forward end of the breech-bolt, Fig. 3; but when the breech-bolt has reached the end of its backward movement, carrying the firing-pin 3 with it against the action of the spring 5, the trigger 6 will be moved into engagement with the shoulder $x$ of the firing-pin to retain the latter while the breech-bolt is moved forward again. When the latter has reached the full extent of its forward movement, it will have closed the breech. The trigger will have been moved to release the firing-pin, which then flies forward under the action of the spring 5 and strikes and explodes the cartridge. The trigger is positively operated without the use of a spring and is set into position to engage with the shoulder $x$ of the firing-pin by the projecting arm $v$ of the breech-bolt coming into contact with the forward side of the trigger when the breech-bolt reaches the end of its rearward movement. As the breech-bolt is moved forward again the trigger 6 cannot be turned by the pressure of the firing-pin and its spring beyond the position at about right angles to the longitudinal axis of the firing-pin by the breech-bolt to the end of its forward movement.

Instead of employing the ordinary spring cartridge-extractor, I make the latter of rigid material without any spring or springless, but free at the proper moment to have a limited movement at about right angles to the action of the breech-bolt. This rigid extractor 4 is carried by the projecting arm $v$ of the breech-bolt, being adapted to a recess $s$ therein.

The extractor is provided with a cylindrical extension $y$, adapted to a corresponding opening $s^2$ in the lug $v$ of the breech-bolt, and the rear side of the extractor is rounded on a curve corresponding with the cylindrical extension $y$. The end $y'$ has, however, upper and lower parallel edges tangent to this rear curved edge, while the front side $y^4$ is turned off on a circle equal to the diameter of the cylindrical end of the arm or lug $v$. As the hole Q of the eccentric strap or ring 7 fits over the lug $v$, the outer end of the extractor is thus firmly held in place, while its cylindrical inner end $y$ is held in the hole $s^2$ in the breech-bolt. It will be understood that the extractor fits easily and not so tightly as to prevent the limited inward and outward movement which it is intended to have.

In the bottom of the groove which receives the eccentric strap or ring 7 for about a quarter of a circle is formed an inclined groove $z\ z'$, deepest at $z'$ and a little deeper than the rim of the cartridge, the groove growing smaller up to the point $z$, where it runs out to nothing. This tapering groove $z\ z'$ is opposite to and is adapted to receive the end $y'$ of the cartridge-extractor. The groove $z\ z'$ is in such position in eccentric 1 that its deepest part will be opposite the end of the cartridge-extractor 4 when the end of the breech-bolt meets the cartridge. As the beveled edge $y^2$ of the extractor meets the rim of a cartridge, it is crowded or pushed out laterally in the slot or groove $s$ of the lug $v$ of the breech-bolt, and the outer end of the extractor finds room for such movement in the aforesaid slots $z\ z'$. As the bolt is carried forward by the eccentric the rear inclined edge $y^3$ of the extractor 4 comes into contact with the bottom of the slot $g$ in the receiver, which causes the extractor to close down upon the rim of the cartridge. As by this time the eccentric 1 has reached such position that the extractor has reached the end of the groove $z\ z'$, the outward movement of the extractor is prevented by its contact with the bottom of the groove containing the ring 7.

In order to hold the cartridge-shell firmly during the extracting movement and prevent it from moving away from the extractors, I provide on the outer end of the breech-bolt a teat $s'$. This teat is not absolutely necessary, as the firing-pin will to some extent answer the same purpose.

I prefer to use in connection with my firearm as a part thereof a device which I have not yet referred to, and this device may be termed a "safety-gate," and is made in the form of a hollow slotted cylinder 8, free to have a partial rotary movement within the frame or receiver B, and embracing the sliding breech-bolt 2. Its movement while the bolt is in motion is quarter-rotary and is produced as follows: The lug $v$ of the bolt 2 is cylindrical in part, but square where it joins the main part of the bolt, Figs. 14, 15, and 16. As the bolt moves back in the slot $b$, Fig. 5, it also moves in the slot of the cylinder $c$, Fig. 11. When the upper rear corner $s^3$ of lug $v$ comes in contact with the point $c'$ at the base of the bevel $c'\ c^2$, pressing thereon, it turns the cylinder partly over, with the result of presenting the opening $c$ in the cylinder to the feed-opening $a$ in the receiver B, Figs. 5 and 6, and at the same time of closing the side opening or guide-slot $b$. This action allows a cartridge to be fed through the opening of the receiver B and through the slot $c$ of the cylinder 8 and prevents such cartridge from rolling out through the slot $b$. As the bolt moves forward the lower forward corner $s^4$ of the square on the lug $v$, Fig. 15, comes into contact at the point $c^3$ with another bevel, and, riding it, turns the cylinder to the same position as that occupied before the backward movement of the bolt. This rolling cuts off the opening $a$ and opens the guide-slot $b$. The slot $d$, Fig. 11, allows the teat $s'$ of the bolt 2 to pass through the cone part of the roller 8. The slot $f$ in the cylinder 8 is cut to allow the trigger to move properly, as is also done in the case of the ring 7, Fig. 13, to the left of the hole Q. This cylinder or safety-gate, it will be seen, answers several purposes. It prevents the cartridge from falling out or becoming otherwise misplaced; it guides the cartridge to and into the chamber; it covers the extractor-hole until the bullet has fairly entered the chamber; it has, moreover, one other effect which has been greatly desired by those working in rapid-firing arms—that is to say, effectually and completely cutting off the cartridge in the receiver from those in the feed-magazine until the former has been fed to the chamber, fired, withdrawn, and ejected—so that in case of premature explosion or hang-fire no danger can ensue. In the latter case experience has shown that the force of the explosion expends itself harmlessly through the guide-slot $b$, and the same result would ensue in the case of premature explosion. Under such conditions my bolt cannot be driven back because of the peculiar construction of the segments $w\ w'$, which hold it locked, save at the point of extreme backward movement, at which time there is no likelihood of premature explosion or hang-fire taking place.

The operation of my arm will be readily understood from the foregoing description; but I may explain the manner of ejecting the cartridge-shell, which is obtained as follows: Referring to Fig. 3, the extractor 4 is shown holding one side of the cartridge-head, and the firing-pin 3 is supposed to be striking the primer. As the bolt moves backward the tension of the spring 5 exerts itself through the pin 3 on the back of the cartridge-shell, which has just been fired, with a tendency to force it away from the face of the bolt. This tendency is resisted by the extractor, and the empty shell is strained to the right, its forward right-hand end dragging along the inner right-hand side of the chamber. As soon as the bolt has been drawn back far enough the empty shell is no longer supported by the side of the chamber, and is forced out through the ejection-slot $b$, Figs. 5 and $6^a$.

Instead of constructing the rotating operating-handle to make a complete revolution, I may construct it so that the handle shall make only a partial rotation and then be returned in the opposite direction. Thus in the modifications shown in Figs. 17, 18, and 19 the rotating handle $h'$ is pivoted to the pin of pin-slide C, as before, and has the dovetailed cocking-segment $w$, engaging with the dovetailed grooves in the frame or receiver; but instead of acting on the bolt through the medium of an eccentric-strap, the laterally-projecting lug $b$ on the breech-bolt is adapted to enter an eccentric-groove or cam-groove $7'$ in the handle. This groove is of such a character, with reference to the entire rotation of the handle, that the breech-bolt will be opened or closed as the handle is turned on its pivot in one direction or the other to an extent determined by the length of the groove $7'$. This groove is provided on its bottom with the inclined under groove $z\ z'$, the same as that shown in Fig. $13^b$, and for the same purpose. The remaining parts of this modified form of my arm are the same as those described with reference to the preceding figures.

My weapon may be used in any suitable mount, such as indicated in Fig. 21, either singly or in groups, or it may be employed as a small-arm and stocked like an ordinary musket, as illustrated in Fig. 22. Preferably, however, I construct the arm to be used in the manner illustrated in Fig. 20. For this purpose a button P, Fig. 2, is provided on the side of the frame of the arm, and on the belt of the user is secured a notched socket S. (Shown on a larger scale in Fig. $20^a$.) The button on the gun is dropped into the socket on the user's belt, so as to find a firm support there, and then the barrel of the gun is held in one hand while the handle is turned by the other. The barrel of the gun may be provided with a hand-hold H, of wood or other suitable material for this purpose, as indicated by dotted lines in Fig. 20.

In another application filed by me December 30, 1890, Serial No. 376,286, I have shown and described a modified construction of gun embodying certain features of my present invention.

I claim as my invention—

1. In a breech-loading fire-arm, the combination of the frame or receiver and a sliding breech-bolt therein with an eccentric and a ring thereon connected to the bolt to impart a reciprocating sliding movement to the latter, and locking devices to lock the bolt to the frame or receiver when closed, all substantially as described.

2. In a breech-loading fire-arm, the combination of the frame or receiver and a sliding breech-bolt therein with a rotating handle mounted on the receiver and having an eccentric and a ring thereon connected to the bolt to impart linear reciprocating movement to the latter by the rotation of the handle and eccentric, all substantially as described.

3. In a breech-loading fire-arm, the combination of the frame or receiver and a tubular breech-bolt therein containing the firing-pin and having a slot with a trigger carried by the frame, and a rotating eccentric on the frame to operate the bolt and trigger, all substantially as described.

4. In a breech-loading fire-arm, the combination of the frame or receiver, a breech-bolt therein and firing-pin carried by the breech-bolt with a trigger on the frame, and a rotating handle carried by the frame and having an eccentric and connecting devices to operate the bolt, the said handle having a projection to act on the trigger to release the firing-pin, all substantially as described.

5. In a breech-loading fire-arm, the combination of the frame or receiver, a breech-bolt therein having a sliding extractor and having a firing-pin with a rotating eccentric carried by the frame and having a groove with an inclined bottom to receive the end of the extractor, all substantially as described.

6. In a breech-loading fire-arm, the combination of the frame or receiver, and a breech-bolt therein having a firing-pin with a trigger carried by the frame, and a rotating handle on the frame to operate the breech-bolt, said handle having a projection to act on the trigger to release the firing-pin at each revolution, substantially as described.

7. In a breech-loading fire-arm, the combination of the frame or receiver and a breech-bolt therein with means to open and close the breech-bolt, and a rotating handle mounted on the frame and connected to the bolt and having a segment to engage with the frame or receiver and lock the bolt to the latter while the breech is closed, substantially as described.

8. In a breech-loading fire-arm, the combination of the frame or receiver and a breech-bolt therein with means to open and close the breech-bolt, and a rotating handle carried by the frame and connected to the bolt and having a dovetailed segment engaging with dovetailed grooves in the frame or receiver to lock the bolt to the latter while the breech is closed, substantially as described.

9. In a breech-loading fire-arm, the combination of the frame or receiver having a feed-opening for the cartridges and an ejection-opening for the shells, and having dovetailed grooves on one side, with a breech-bolt in the frame and a rotating handle mounted on the frame and connected to the bolt to open and close it, and having a dovetailed segment to engage with the grooves in the frame or receiver to lock the bolt to the latter while the breech is closed.

10. In a breech-loading fire-arm, the combination of the frame or receiver carrying a pivoted trigger with a tubular breech-bolt in the frame and containing a firing-pin, and having a longitudinal slot through which the nose of the trigger projects to engage with the firing-pin, and a rotating handle mounted on the frame to operate the breech-bolt and carrying a projection to act on the trigger to release the firing-pin, all substantially as described.

11. In a breech-loading fire-arm, the combination of the frame or receiver and a breech-bolt therein carrying a firing-pin with a rotating handle to operate the breech-bolt and lock the latter to the receiver, a detachable slide in the frame carrying the pivot for the said rotating handle, and a cap to secure the slide in place, substantially as described.

12. In a breech-loading fire-arm, the combination of the frame or receiver having openings for the feeding of the cartridges and ejection of the shells with a sliding breech-bolt in the frame and a rotary slotted cylinder around the breech-bolt and within the frame to open and close the feed-opening, substantially as described.

13. In a breech-loading fire-arm, the combination of the frame or receiver having feed and ejection openings for the cartridges and shells, with a breech-bolt having a lug and a rotary cylinder around the breech-bolt and within the frame, and provided with a cam-slot in which the lug on the bolt works to open and close the feed-opening for the cartridges, substantially as described.

14. In a breech-loading fire-arm, the combination of the frame or receiver having feed and ejection openings for the cartridges and shells with a breech-bolt and a cylinder around the bolt and within the frame and beveled at its inner front end to receive and guide the beveled front end of the bolt, substantially as described.

15. In a breech-loading fire-arm, the combination of the frame or receiver with a breech-bolt therein having at its front end a lug grooved at about right angles to the axis of the bolt for the reception of a sliding springless extractor which can slide in the groove to a limited extent, and means for locking the extractor closed and for releasing it again.

16. In a breech-loading fire-arm, the combination of the frame or receiver with a breech-bolt therein, having at its front end a grooved lug, a springless extractor adapted to the groove, and positively-acting devices, substantially as described, for locking the extractor on the cartridge-rim and for releasing it.

In testimony whereof I have signed my name to this specification in the presence of two subscribing witnesses.

WILLIAM D. FORBES.

Witnesses:
EDITH J. GRISWOLD,
JOHN REVELL.